US005663717A

United States Patent [19]

DeLuca

[11] Patent Number: 5,663,717

[45] Date of Patent: Sep. 2, 1997

[54] METHOD AND APPARATUS FOR PRIORITIZING MESSAGE TRANSMISSIONS AND ALERTS IN A RADIO COMMUNICATION SYSTEM

[75] Inventor: Michael Joseph DeLuca, Boca Raton, Fla.

[73] Assignee: Motorola, Inc., Schaumburg, Ill.

[21] Appl. No.: 642,202

[22] Filed: May 6, 1996

Related U.S. Application Data

[63] Continuation of Ser. No. 283,370, Aug. 1, 1994, abandoned.

[51] Int. Cl.[6] .......... H04Q 7/18

[52] U.S. Cl. .......... 340/825.36; 340/825.44; 340/323 R; 455/38.2

[58] Field of Search .......... 340/825.27, 825.44, 340/323 R, 325.36, 311.1, 825.47, 825.52, 825.69; 345/24; 455/133, 38.2, 57.1, 137, 140

[56] References Cited

U.S. PATENT DOCUMENTS

| | | | |
|---|---|---|---|
| H1173 | 4/1993 | Davis et al. . | |
| 4,438,433 | 3/1984 | Smoot et al. | 340/825.44 |
| 4,473,824 | 9/1984 | Claytor | 340/825.27 |
| 4,758,834 | 7/1988 | Sato et al. . | |
| 4,783,654 | 11/1988 | Ichikawa | 340/825.44 |
| 4,845,491 | 7/1989 | Fascenda et al. | 340/825.44 |
| 4,868,561 | 9/1989 | Davis . | |
| 4,872,005 | 10/1989 | DeLuca et al. | 340/825.44 |
| 4,922,221 | 5/1990 | Sato et al. . | |
| 4,994,797 | 2/1991 | Breeden . | |
| 5,043,721 | 8/1991 | May . | |
| 5,122,778 | 6/1992 | Erhart et al. . | |
| 5,173,688 | 12/1992 | DeLuca et al. | 340/825.44 |
| 5,225,826 | 7/1993 | DeLuca et al. | 340/825.44 |
| 5,247,519 | 9/1993 | Snowden et al. | 340/825.44 X |
| 5,398,021 | 3/1995 | Moore | 340/825.27 |
| 5,426,422 | 6/1995 | Vanden Heuvel et al. | 340/825.27 |
| 5,430,439 | 7/1995 | Bodet et al. | 340/825.44 |
| 5,430,440 | 7/1995 | Shim | 340/825.44 |

*Primary Examiner*—Michael Horabik
*Assistant Examiner*—William H. Wilson, Jr.
*Attorney, Agent, or Firm*—Keith A. Chanroo; Kelly A. Gardner

[57] ABSTRACT

A communications system (100) for transmission of a plurality of messages over a communications channel includes a terminal (105) for selectively transmitting each of the plurality of message, and data communication receivers (110) for receiving first and second messages about the same event. The first and second messages are compared in order to determine the status change of the event, and an alert priority is issued indicating that the event is at a critical stage, based on such comparison.

9 Claims, 10 Drawing Sheets

100

METHOD AND APPARATUS FOR PRIORITIZING MESSAGE TRANSMISSIONS AND ALERTS IN A RADIO COMMUNICATION SYSTEM

This is a continuation of application Ser. No. 08/283,370, filed Aug. 1, 1994 and now abandoned.

FIELD OF THE INVENTION

This invention relates in general to communication systems for providing messages, and more specifically to a communication system in which alerts and transmissions are prioritized.

BACKGROUND OF THE INVENTION

It may be necessary for a sports fan to be away from a live television or radio broadcast of a sporting event while attending another important occasion, such as a business meeting. Nevertheless, the sports fan desires to know the changes in the status of the sporting event or game as they occur. This desire may be fulfilled with a portable information receiver which receives and alerts the user of game changes as they occur. Use of such a receiver allows the sports fan to concentrate on other important events while remaining informed of changes in the game. One portable information receiver capable of functioning as described is the Motorola SportsTrax™ sporting event receiver. This sporting event receiver receives information about status changes in baseball games, the status changes being transmitted by a paging system using a typical paging protocol, such as the POCSAG (Post Office Code Standardization Advisory Group) format.

A baseball game has many status changes, some of which are important to the outcome of the game and some of which are substantially less important. Since the sports fan using a sporting event receiver may be attending another important occasion, the sports fan may desire the sporting event receiver to interrupt the important occasion with an alert only in response to an important status change in the baseball game. However, the type of status change in the game itself is often an insufficient criterion for determining which status changes in the game are important. For example the type of status change in a baseball game could be the scoring of a run by a home team. A run scored by a home team which breaks a tied score is substantially more important than a run scored by the home team when the home team already has a substantial lead. The sports fan may prefer to be interrupted with an alert in response to the scoring of the tie breaking run, and not to be interrupted when the home team increases an already substantial lead. Thus, what is needed is a sporting event receiver capable of determining when a status change is important enough to generate an alert interrupting an import occasion attended by the sports fan.

Furthermore, the importance of the occasion attended by the sports fan may vary depending upon the circumstances and type of occasion. In response, the sports fan may want to vary the level of importance of a status change which will cause the sporting event receiver to cause an interruption. For example the sports fan may be attending a very important occasion such as a wedding and may desire to only be alerted of only very important status changes, such as the making or breaking of a tie score. On the other hand, the sports fan may be attending a less important occasion such as a training lecture, and thus would prefer to be alerted of many, if not all, of the changes in the game status. For example, the sports fan could prefer to be alerted of all score changes. In addition, if the score is close, then the sports fan might prefer being alerted of the number of outs in an inning. However, the sports fan might not prefer to be alerted of less important changes such as changes in base runners or the number of outs when the score is not dose. Thus, what is needed is a sporting event receiver capable of determining when a status change is important enough to generate an alert which interrupts an occasion of varying importance.

Furthermore, paging channels are already crowded with information being sent to many paging receivers. Information services, such as sporting event services, share the paging system with other users and may be billed by the amount of information transmitted. In order to maximize profits, it is desirable to reduce the cost of information transmitted by reducing the transmission of unimportant information. For example status changes such a balls and strikes occur rapidly and seldom have an important impact upon the game. Their occurrence may only be important enough to merit the expense of their transmission under certain circumstances such as a tie score or in the final inning of the game. Thus, what is needed is a way to minimize the amount of status changes transmitted in the signal without substantially reducing the importance of information received by the sports fan.

Also, as the paging channel crowding varies over time, the latency and grouping of paging messages changes. On a crowed paging system, the message latency, or delay from the origination of a message to its transmission, may be considerable. A considerable delay includes delays ranging from one to five minutes. For rapidly changing game information status, a substantial latency in the paging system may render information of little importance. The information may actually become a meaningless nuisance to the sports fan because the information is outdated by the time it is received. Similarly, the queuing of messages by the paging system may group messages of certain types together for bulk transmission. For rapidly changing, low importance information, this may make the reception of the information a nuisance for the sports fan. For example, the grouping of three status changes including of one "strike" and two "balls" for grouped bulk transmission by a paging system would result in the almost simultaneous reception of all three status updates. The grouped timing of the reception of low importance, multiple status changes could be perceived as a nuisance by the sports fan. Furthermore, these messages burden an already crowded paging system. Thus, what is needed is a method of reducing the number of unnecessary messages sent by a paging system.

SUMMARY OF THE INVENTION

A method for prioritizing alerts in a data communication receiver comprises the steps of receiving a first message including first status information, determining an alert priority in response to the first status information, and receiving a second message including second status information. Thereafter, a status change priority of a status change indicated by the second message is determined, and a user is selectively alerted in response to reception of the second status information responsive to the alert priority and the status change priority.

In a communication system, a method for reducing transmissions of a plurality of messages over a communication channel comprises the steps of receiving a message of the plurality of messages and determining a message priority for the message. The message is selectively transmitted based upon the message priority of the message.

A data communication receiver for prioritizing alerts comprises a receiver for receiving a current message including current status information, a message memory for storing a previous message including prior status information, and a priority alert element coupled to the message memory for setting an alert priority in response to the prior status information. An alert mechanism coupled to the receiver and the priority alert element selectively alerts a user in response to reception of the current status information based upon the alert priority.

A communication system for reducing transmissions of a plurality of messages over a communication channel comprises a terminal for selectively transmitting each of the plurality of messages based upon message priorities for the plurality of messages and a data communication receiver for receiving transmitted messages from the terminal.

DESCRIPTION OF A PREFERRED EMBODIMENT

Figure 1:
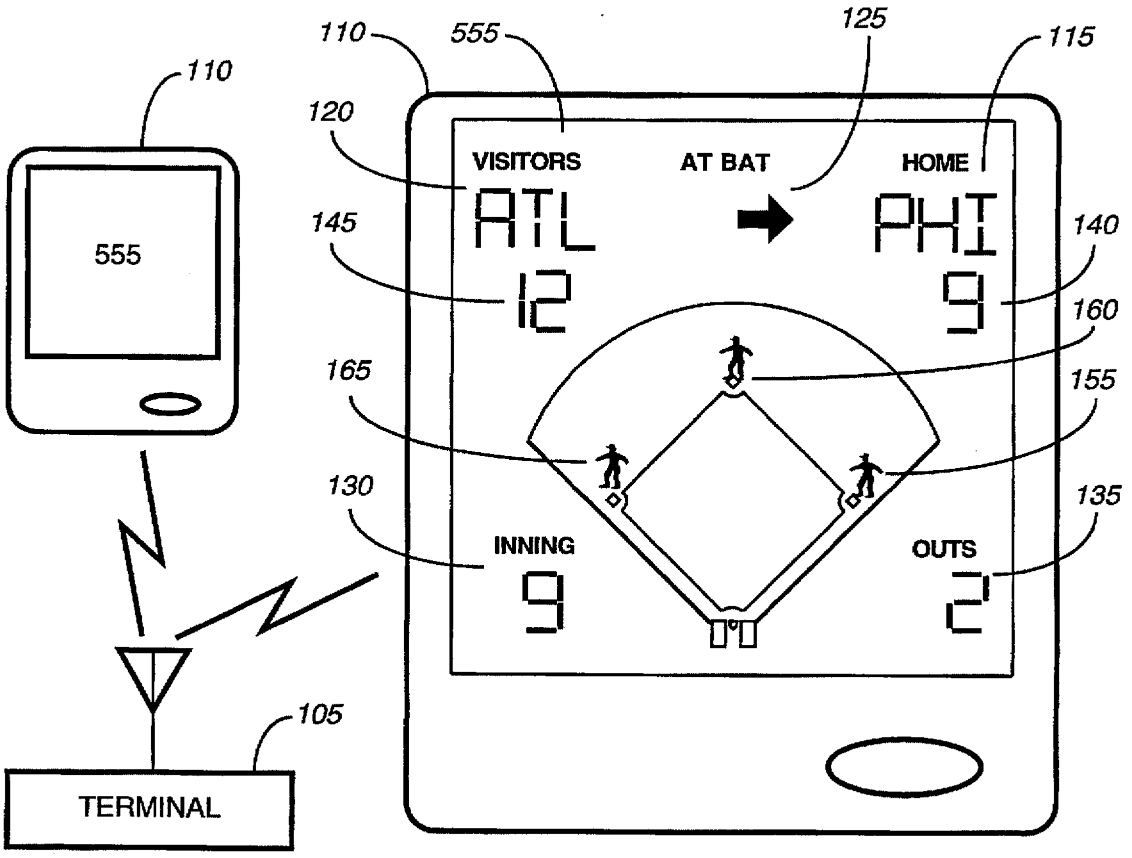
FIG. 1 is an electrical block diagram of a communication system, in accordance with the present invention, in which details of a receiver display are illustrated.

FIG. 1 is an electrical block diagram of a communication system 100, e.g., a radio communication system, comprising a terminal 105 for transmitting messages concerning sports events to a plurality of data communication receivers 110, such as portable pagers or transceivers, either over the air or via other transmission means, such as a direct link. The messages received by the data communication receivers 110 preferably include information relating to an entire status for a multiple status event. By way of example, a message can include information conveying the entire status of a sports event, such as a baseball game.

According to the present invention, the data communication receivers 110 receive common messages about sports events on the same paging address. By way of example, when the data communication receivers 110 are to receive information about baseball or football, each data communication receiver 110 is associated with the common paging address and is also associated with a particular sports team by means of a stored recipient identification (ID) code indicative of that team. A data communication receiver 110 preferably receives a sports message for a particular sports event and scans the message to determine whether or not its "team ID" is included in that message to indicate that the message is of interest to the user. When the team ID associated with the data communication receiver 110 is included in the message, the data communication receiver 110 compares the current status of the sports event with prior status information concerning the sports event to determine whether any status changes have occurred in the event. When one or more changes in the event have occurred, the data communication receiver 110 can alert the user with at least one predetermined alert to indicate to the user whether the status change is favorable or unfavorable to the team associated with the receiver 110.

For instance, when the multiple status event that is the subject of the message is a baseball game, the comparison of the current status information with the prior status information may reveal, among other things, that an inning has changed, one of the teams has gotten an out, a runner has advanced, or the score has changed. In accordance with the present invention, these changes are indicated to the user by an alert indicative of the favorable or unfavorable nature of the change. When the team associated with the receiver 110 scores a run, for example, the user can be alerted with a "yea!" alert, while unfavorable status changes are indicated by a "boo!" alert. Furthermore, according to the present invention, multiple status changes can be indicated by alerts. In this manner, a user who has carried his data communication receiver 110 out of range and therefore missed one or more game messages can, upon receiving a next message, be alerted with multiple alerts indicative of the different status changes that have occurred since reception of a previous message.

According to the present invention, the data communication receiver 110 automatically prioritizes status changes based upon stored information. Thereafter, based upon the prior status information of the game, alerts can be generated to indicate some or all of the status changes. For example, during non-critical portions of the game, such as the beginning innings of the game, the receiver 110 could alert the user only of high priority status changes, while, during the last inning, the user could be alerted to a greater number of status changes associated with both high and low priorities. In this manner, the user, during critical portions of the game, can be alerted to each change that could potentially affect the outcome of the game.

The alerts generated by the receiver 110 can further be prioritized by a user-programmable prioritization of an activity in which the user is currently involved. According to the present invention, the user can enter information by which the importance of the user's current activity, such as a meeting or lunch, can be determined. The data communication receiver 110 then preferably alerts the user to status changes based on the "user activity priority" as well as the prior status information. Therefore, the user is conveniently informed of lower priority status changes during unimportant activities and only higher priority status changes during more important activities.

The receiver 110 includes a display 555 which preferably displays the entire status of the game. It includes identifiers indicating the home and away teams 115, 120 and which team is at bat 125. Also indicated is the inning number 130, the number of outs 135, and the home and visitor scores 140, 145. Furthermore, the display includes the shape of a baseball diamond, as shown, with icons 155, 160, 165 for indicating the status of runners on first, second, and third bases. Thus, display 555 allows the user to observe the entire status of the game on a single screen.

Alternately, or in addition to multiple audio alerts, video alerts may be generated by flashing any status changes on the display 555. For example, if the home team is at bat, a prior game status had a runner on third, a current game status has a runner on first, and the score has changed, then the receiver 110 would generate an audio run alert and an audio hit alert corresponding to the status changes. Additionally, the new score of the home team 140 would flash while the first base runner icon 155 would also flash to provide video alerts.

Figure 2:
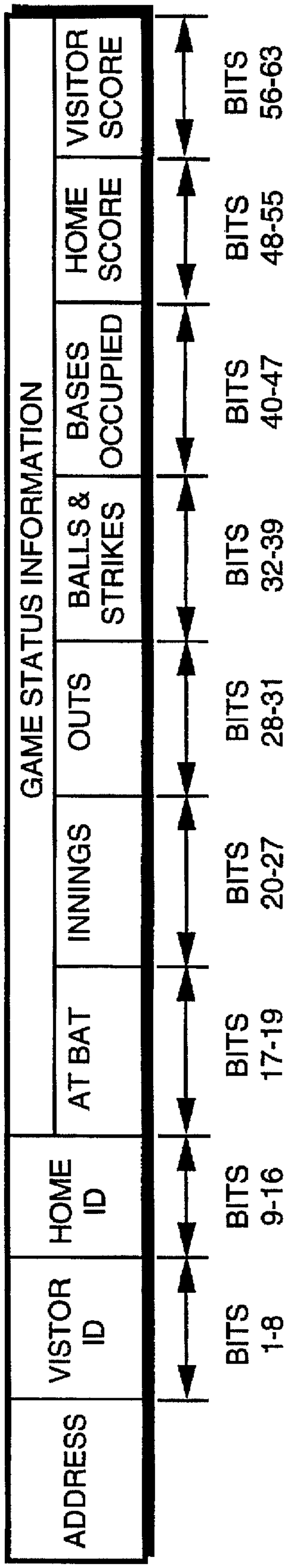
FIG. 2 is a signal diagram of a radio frequency signal including a message transmitted by a terminal included within the communication system of FIG. 1 to a data communication receiver included within the communication system of FIG. 1 in accordance with the present invention.

FIG. 2 illustrates an example of a radio frequency (RF) signal including a message that can be transmitted from the terminal 105 to the receivers 110 to update users of the receivers 110 on a particular sports event, such as baseball. The RF signal includes a paging address which, as mentioned above, is a common address associated with each of the receivers 110 included in the communication system 100. Appended to the address is the message, which preferably comprises recipient, or team, IDs 205, 210 located in predetermined locations within the message to indicate which two baseball teams are currently playing a baseball game that is the subject of the message. The team IDs 205, 210 can, for example, each consume eight bits of the message. According to the present invention, the team IDs 205, 210 indicate by their locations which of the two teams is the home team and which of the two teams is the visitor team. In this example, the ID 205 for the visitor team is included first in the message, at bits one through eight, and is followed by the home team ID 210, at bits nine through sixteen. The message further comprises game status information 215 comprising the entire status of the sports event. More specifically, the game status information 215 preferably includes a plurality of different statuses which are indicative of the game status and which are located at predetermined locations within the message. Such game status information 215 can include, for example, an indication of which team is currently batting, the game inning, the number of outs, the number of balls and strikes, the score, and the bases occupied. It will be appreciated that other information about a sports event could be included within the game status information as well.

In accordance with the present invention, a data communication receiver 110 associated with one of the team IDs 205, 210 can determine, from the location of its ID within the message, whether its team is the home team or the visitor team. Thereafter, the data communication receiver 110 can compare the current status information to prior status information about the same game to determine whether there have been any status changes in the game. Such status changes are indicated to the user by the generation of one or more alerts indicating to the user whether the status changes are favorable or unfavorable to the team associated with the receiver 110. Preferably, the status changes, along with the game status information, are, at the same time, displayed to the user.

When the comparison of the current and prior status information reveals that no status changes have occurred in the game since reception of a previous message concerning the same game, reception of the new message is preferably not announced to the user. As a result, multiple duplicate messages can be transmitted within the communication system 100 without bothering the user with multiple alerts indicative of reception of identical messages. This feature advantageously allows duplicate message transmission within the communication system 100 for the purposes of ensuring accurate message reception and ensuring message reception for data communication receivers 110 that might have momentarily been located out of range of transmissions.

It will be appreciated that the message of FIG. 2 is depicted for example purposes only and that the placement of the team IDs 205, 210 and the various statuses included in the game status information 215 can vary as long as the placement is predetermined and recognizable by the receiver 110. It will be further appreciated that the number of team IDs and types of game status information 215 can vary depending upon the sports event or other multiple status event with which the data communication receiver 110 is associated. If, for example, information about a horse race is to be transmitted to the receivers 110, the number of team IDs would be equal to the number of entries in the race and the game status information might include information such as the number of laps left in the race and the lead horse.

It will be further appreciated that the game status information could include only status changes, rather than an entire game status. In accordance with this alternate embodiment of the present invention, the data communication receiver 110 would not have to compare the prior and current status information to determine the status changes in the game; however, in situations in which the data communication receiver 110 missed a message, e.g., when out of range or when turned off, a next received message would not be useful without reference to the missed message because the message itself contains the status changes.

Figure 3:
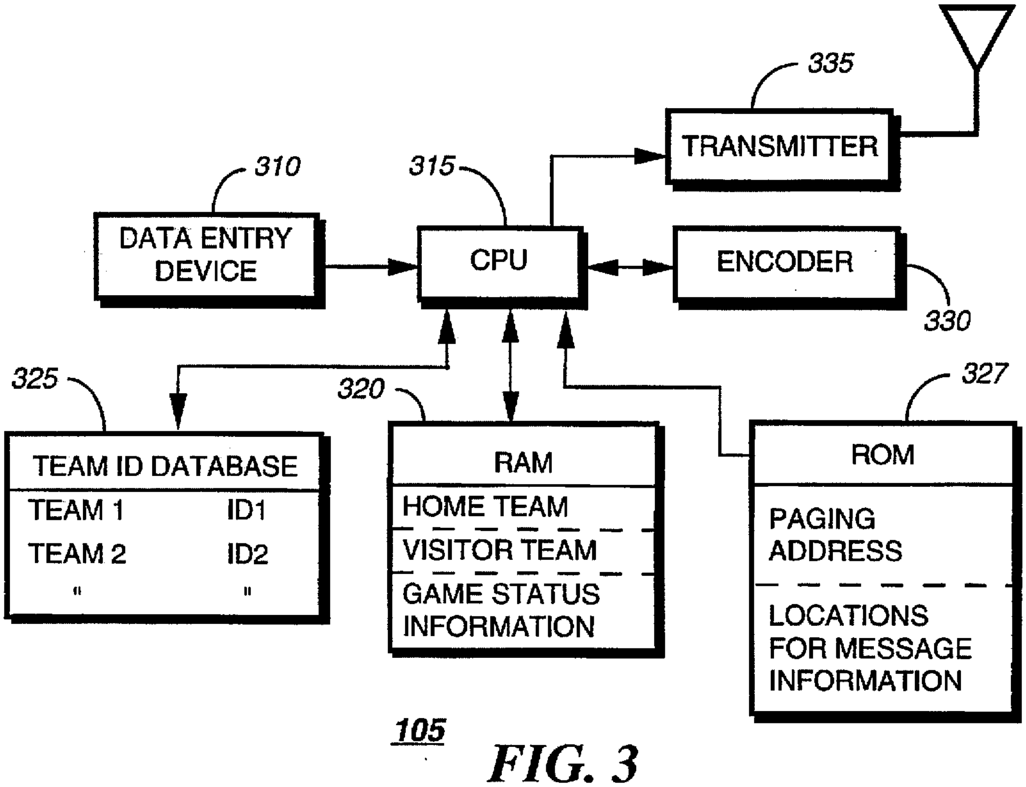
FIG. 3 is an electrical block diagram of the terminal included within the communication system of FIG. 1 in accordance with the present invention.

Referring next to FIG. 3, an electrical block diagram of the terminal 105 is depicted. The terminal 105 preferably comprises a data entry device 310, such as a keyboard, for entering the game status information and information about which teams are involved in the sports event. Additionally, at the beginning of a sports event such as a baseball game, the data entry device 310 can be utilized to enter information indicative of which team is the home team and which team is the visitor team. The information provided by the data entry device 310 is received by a central processing unit (CPU) 315 coupled thereto for controlling the operation of the terminal 105. The CPU 315 stores the information provided by the data entry device 310 in a memory, such as a random access memory (RAM) 320.

The terminal 105 further comprises a database 325 for storing a list of all of the teams and the team IDs associated therewith. The team ID can be, if sufficient space is available within the message, the name of the team. Alternatively, the team ID could be an abbreviated form of the team name or any other information by which the team can be identified.

A read only memory (ROM) 327 stores the paging address shared by the receivers 110 included in the communication system 100 and further stores locations for the various information to be included in the message. More specifically, the predetermined locations within the message for each type of information, e.g., team ID and game status information, are stored in the ROM 327 for use by the terminal 105 in sending the message.

The terminal 105 also includes an encoder 330 coupled to the CPU 315 for encoding the address, the team IDs, and the game status information into a message in a conventional manner. By way of example, the message could be encoded using preferably the POCSAG (Post Office Code Standardization Advisory Group) signalling format, the Flex™ signalling format, or the GSC (Golay Sequential Code) signalling format. The encoded message is provided to a transmitter 335 for transmitting the message as a radio frequency signal.

Figure 4:
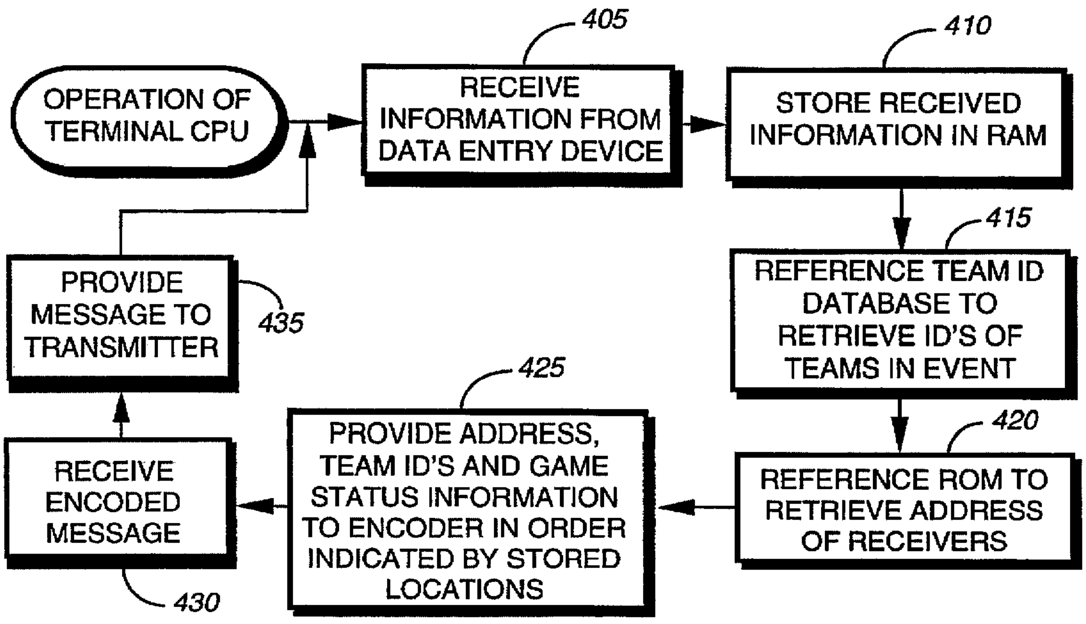
FIG. 4 is a flowchart of the operation of a processing unit included within the terminal of FIG. 3 in accordance with the present invention.

FIG. 4 is a flowchart illustrating the operation of the terminal CPU 315 in accordance with the present invention. Preferably, the CPU 315 receives, at step 405, the information, e.g., the game status information and visitor and home team information, from the data entry device 310 and stores, at step 410, the information in the RAM 320. Thereafter, the CPU 315 references, at step 415, the team ID database 325 to determine the team IDs for the visitor and home teams involved in the current event. The CPU 315 further references, at step 420, the ROM 327 to retrieve the paging address of the receivers 110. The address, team IDs, and game status information are then, at step 425, provided to the encoder 330 for encoding into a message having the appropriate signalling format and including the different types of message information at the appropriate predetermined locations.

By way of example, the CPU 315 can provide the visitor team ID to the encoder 330 as the first eight bits of the message when the first eight bits of the message are the predetermined location for the visitor team ID. When bits nine through sixteen are the predetermined location for the home team ID, the CPU 315 can provide the home team ID to the encoder 330 as the next eight bits of the message. This procedure is preferably also followed for placement of the various statuses within the game status information in predetermined locations of the message. After the encoded message is received, at step 430, by the CPU 315, the message is provided, at step 435, to the transmitter 335 for transmission to the receivers 110.

Figure 5:
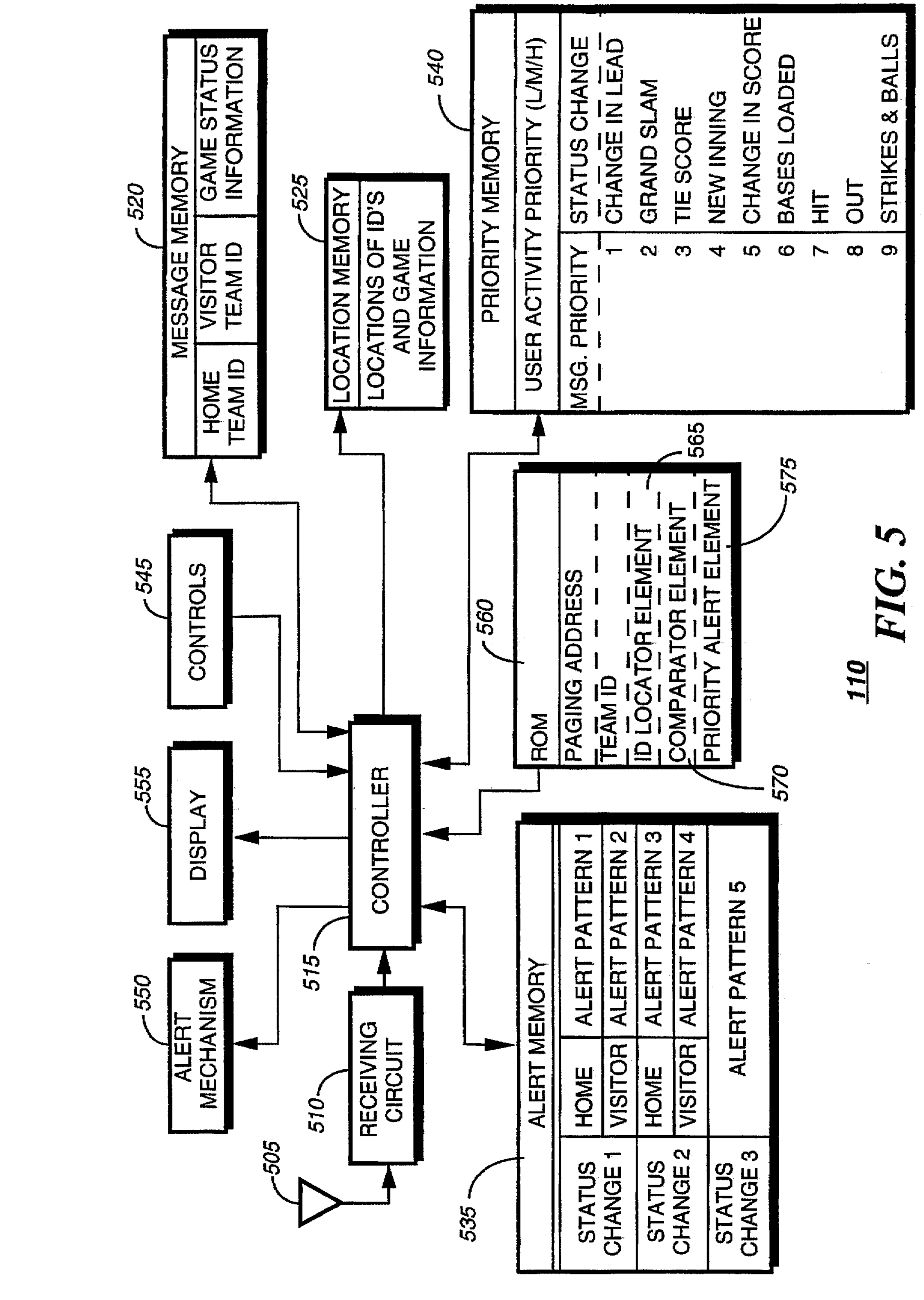
FIG. 5 is an electrical block diagram of the data communication receiver included within the communication system of FIG. 1 in accordance with the present invention.

Referring next to FIG. 5, an electrical block diagram of the data communication receiver 110 is shown. The data communication receiver 110 preferably includes an antenna 505 for receiving an RF signal transmitted by the terminal 105 (FIG. 1). A receiving circuit 510 coupled to the antenna 505 decodes the RF signal to recover the message and address included therein in a manner well known to one of ordinary skill in the art and provides the message to a controller 515, which controls the operation of the data communication receiver 110. It will be appreciated, however, that, in embodiments in which the data communication receiver 110 receives the message over different communication media, the use of the antenna 505 and receiving circuit 510 for reception and decoding of the RF signal may be unnecessary.

The data communication receiver 110 further comprises a message memory 520, which stores received messages when the message address is equivalent to the address associated with the receiver 110, and a location memory 525, which stores parameters including the predetermined locations within each message for the visitor team ID, home team ID, and game status information. Additionally, an alert memory 535 preferably stores a plurality of predetermined alerts, e.g., alert patterns for driving a transducer, that are associated with favorable and unfavorable status changes in the entire status of a sports event. A priority memory 540 stores a listing of possible status changes within the sports event and their relative priorities as well as a user activity priority indicating the importance of an activity in which the user is currently involved.

By way of example, when the sports event is a baseball game, the status changes can include, among other things, the changes in the score, inning, number of outs, advancement of runners, and number of bases occupied. These changes are preferably prioritized, either by the user or by the service provider, so that multiple status changes between current status information and prior status information can be prioritized according to the information stored in the priority memory 540. Thereafter, depending upon the prior status information, different levels of prioritized status changes are utilized to generate alerts, as will be explained in greater detail below. When the user has entered a priority for his current activity, this priority is also utilized to further specify the levels of prioritized status changes to which the user will be alerted. Controls 545 coupled to the controller 515 allow the user or a service provider to input information to the receiver 110 by which possible status changes can be prioritized and by which the priority of the current user activity can be prioritized.

The data communication receiver 110 further comprises an alert mechanism 550 for generating audio alerts based upon the alert information stored in the alert memory 535 and a display 555 for displaying the visual alerts and the game status information included in the message to the user. Another memory, such as a read only memory (ROM) 560, stores the paging address associated with the receivers 110 within the communication system, the team ID associated with the receiver 110, and firmware elements used in processing a received message. According to the present invention, such firmware elements include an ID locator element 565 for monitoring the message to find a team ID associated with the receiver 110 and determining the whether the team associated with the receiver 110 is the home team or the visitor team. A comparator element 570 compares current status information for the sports event with previous status information to determine whether there have been any status changes in the entire status of the sports event. The ROM 560 further stores a priority alert element 575 for utilizing the status changes to determine which alerts should be generated and the order thereof, e.g., for setting an alert priority for incoming messages.

The controller 515, message memory 520, location memory 525, priority memory 540, ROM 560, and alert memory 535 can, by way of example, be implemented using a microcomputer, such as the MC68HC05, C08, or C11 series manufactured by Motorola, Inc. Alternatively, the above-listed devices can be implemented through use of hardwired elements capable of performing equivalent operations. The antenna 505, receiving circuit 510, alert mechanism 550, controls 545, and display 555 can be implemented using conventional devices.

According to the present invention, the data communication receiver 110 can advantageously determine from a message whether a team of which the user is a fan is the subject of the message and whether the team is the home or visitor team. Additionally, the receiver 110 can determine from a comparison of the current message with a previous message about the same multiple status event, e.g., sports event, whether any changes have occurred in the status of the event since reception of the previous message. As mentioned above, the status changes could alternatively be provided to the receiver 110 by the status change messages from the terminal 105 such it would not be necessary for the receiver 110 to compare the prior and current status information to determine the status changes. When such changes have occurred, the changes are prioritized according to an order indicated by a programmable memory, i.e., the priority memory 540. The priority memory 540 can indicate, for instance, that a change in the game score is of the highest priority such that an alert indicative of the score change should be generated prior to generation of further alerts for announcing other changes. The receiver 110 then references the prior status information as well as a user activity priority, if programmed, to determine which of the status changes are to be announced by an alert to the user. As a result, when the user activity priority is high, indicating that the user is involved in an important activity, and the prior status information indicates that the game is at a non-critical stage, the user is preferably only be alerted to high priority status changes. Conversely, when the user activity priority is low, and the game is at a critical stage, e.g., last inning, the user is preferably alerted to low priority status changes as well as high priority status changes.

Preferably, all changes, even those designated as low priority, are visibly presented, such as by flashing relevant information on the display 555, to the user during the presentation of the game status information on the display 555. Alternately, a symbol could be displayed indicative of the change; for example, the word "run" could be displayed in response to a change in the score.

Figure 6:
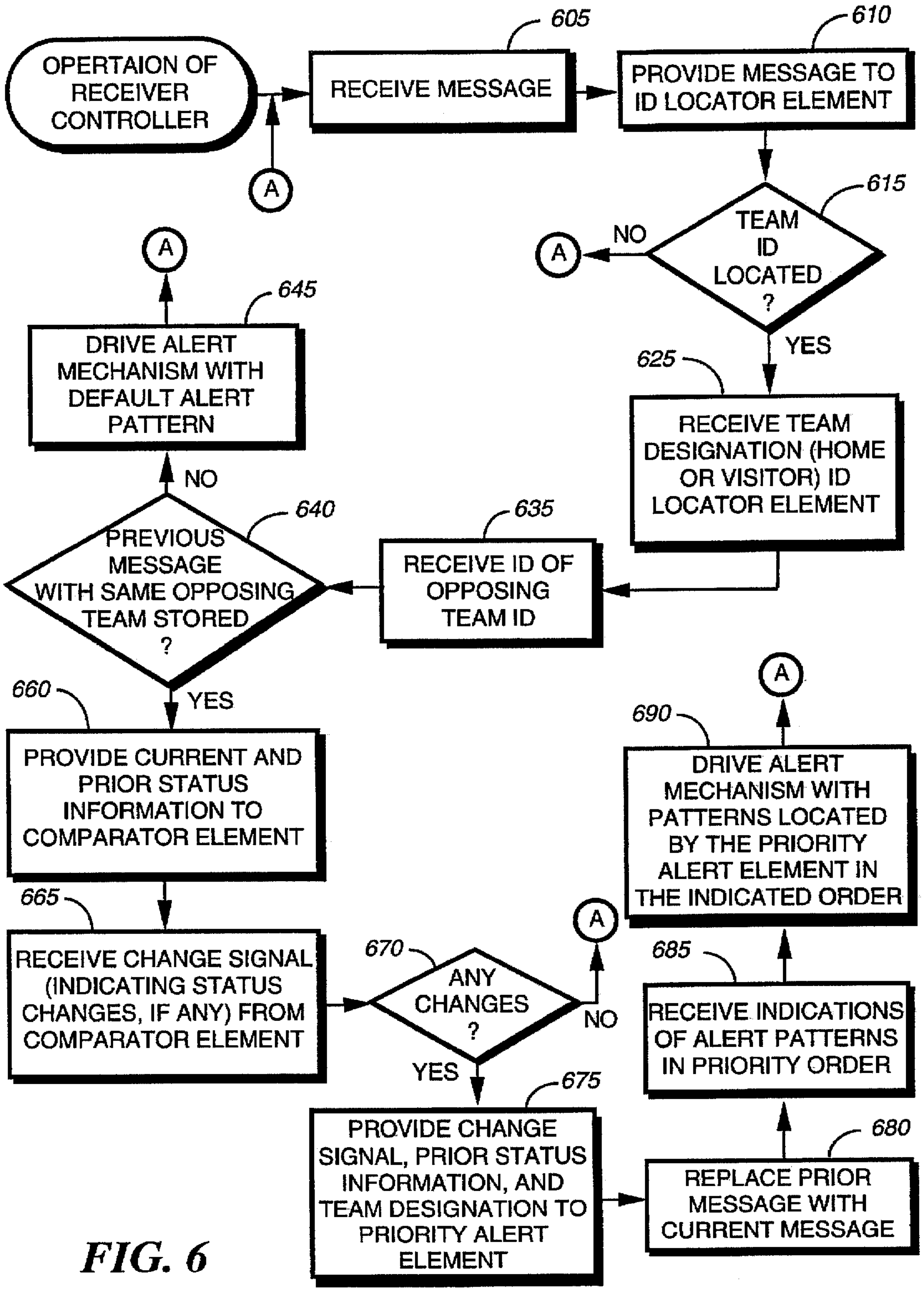
FIG. 6 is a flowchart of the operation of a controller included within the data communication receiver of FIG. 5 in accordance with the present invention.

FIG. 6 is a flowchart depicting the operation of the controller 515 (FIG. 5) included within the data communication receiver 110. At step 605, the controller 515 receives the address and message from the receiving circuit 510. When the received address is equivalent to the stored paging address, the message is provided, at step 610, to the ID locator element 565 for location, at step 615, of the team ID associated with the receiver 110 and a determination of whether the receiver team is the home or visitor team. When, at step 615, the team ID is located, indicating that the receiver team is currently playing in a sports event, the controller 515 receives, at step 625, a signal indicative of the receiver team designation, e.g., home or visitor, from the ID locator element 565. Additionally, the controller 515 receives, at step 635, the team ID for the opposing team.

Next, at step 640, the controller 515 determines whether a previous message about the same sports event, e.g., baseball game, is stored. This can be accomplished by referencing the message memory 520 (FIG. 5) to locate any other stored message including the same home and visitor team IDs. When there is no previous message relating to the same sports event, the controller 515 can, at step 645, drive the alert mechanism 550 (FIG. 5) with a default alert pattern to indicate to the user that the received message is the initial game message.

When, at step 640, a previous message concerning the same game is stored in the message memory 520, the controller 515 provides, at step 660, the current game status information of the incoming message and the prior game status information of the previous message to the comparator element 570 (FIG. 5). The comparator element 570 generates a change signal indicating whether a change in the status information has occurred and, if so, which status changes have occurred. The change signal is provided to the controller 515, at step 665. When, at step 670, the change signal is indicative of at least one status change, the controller 515 provides, at step 675, the change signal, the prior status information, and the receiver team designation to the priority alert element 575 (FIG. 5). Thereafter, at step 680, the previous message is replaced with the current message in the message memory 520. At step 685, the controller 515 receives from the priority alert element 575 an indication of at least one alert pattern to be used to drive the alert mechanism 550. The one or more alert patterns are then, at step 690, used by the controller 515 to drive the alert mechanism 550 in an order indicated by signals provided by the priority alert element 575, as will be explained in greater detail below.

Figure 7:
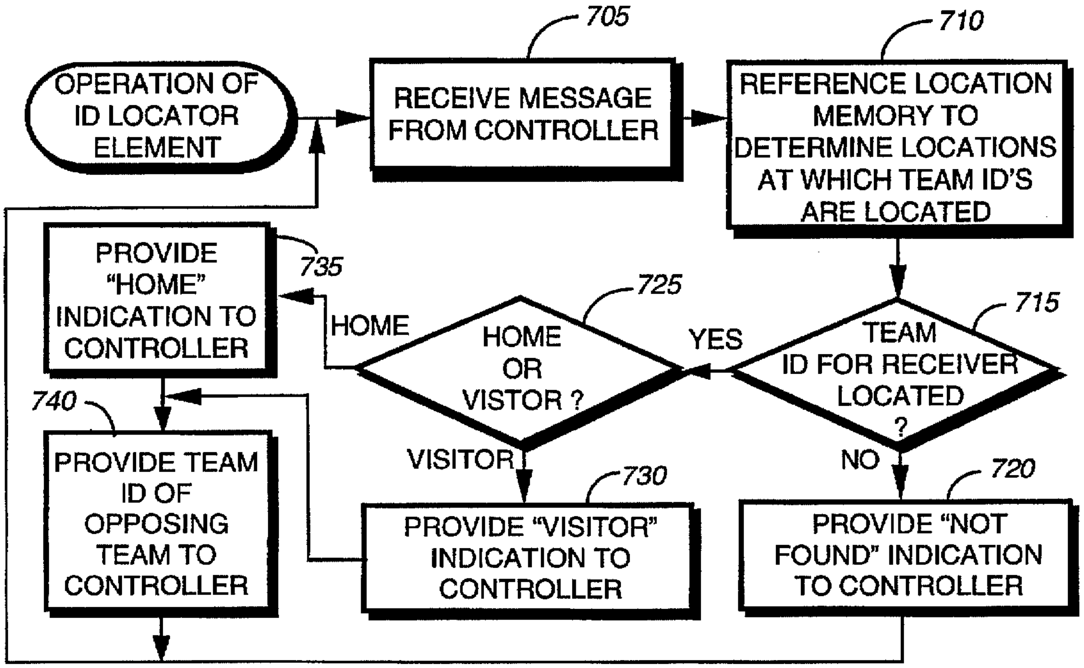
FIG. 7 is a flowchart illustrating the operation of an identification locator element included within the data communication receiver of FIG. 5 in accordance with the present invention.

Referring next to FIG. 7, a flowchart depicts the operation of the ID locator element 565 (FIG. 5). At step 705, the ID locator element 565 receives the message from the controller 515 and, at step 710, references the location memory 525 to determine the different locations at which the team IDs are located within the message. Subsequently, the ID locator element 565 scans the indicated locations to locate the team ID associated with the data communication receiver 110. When, at step 715, the team ID of the receiver 110 is not located, the ID locator element 565 generates, at step 720, a "not found" indication for transmission to the controller 515 to indicate that the incoming message does not concern a team of which the user is a fan. When, at step 715, the team ID is located in one of the predetermined message locations for placement of the team IDs, the ID locator element 565 further determines, at step 725, whether the receiver team is the home team or the visitor team from the location within the message of the team ID. When the receiver team is the visitor team, a "visitor" signal is provided, at step 730, to the controller 515, and, when the receiver team is the home team, a "home" signal is provided, at step 735, to the controller 515. Additionally, at step 740, the ID locator element 565 provides the team ID of the opposing team to the controller 515 by retrieving the ID located in the predetermined ID location in which the receiver team is not located.

Figure 8:
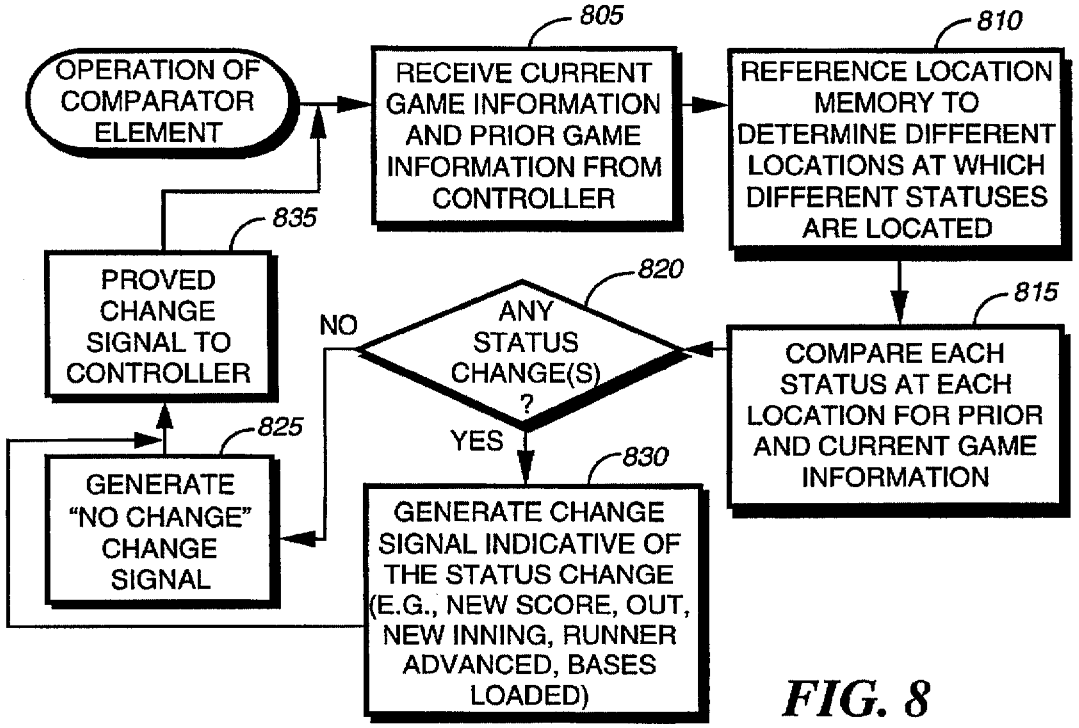
FIG. 8 is a flowchart depicting the operation of a comparator element included within the data communication receiver of FIG. 5 in accordance with the present invention.

FIG. 8 is a flowchart illustrating the operation of the comparator element 570 (FIG. 5) in accordance with the present invention. At step 805, the comparator element 570 receives the current game status information and the prior game status information from the controller 515. The comparator element 570 next references, at step 810, the location memory 525 to determine the locations at which different game statuses, such as team at bat, bases occupied, etc., are located. Each status is compared, at step 815, for the prior and current status information to determine whether there are any status changes between the prior and current status information. When, at step 820, there is no status change, the comparator element 570 generates a change signal indicating that there has been no status change. When, on the other hand, status changes have occurred, a change signal is generated, at step 830, to indicate the status changes. The change signal could, for instance, relate that there has been a new score that places the home team ahead, a new score that places the visitor team ahead, an out for the home team or for the visitor team, an inning change, other another change pertinent to the status of the game. At step 835, the change signal is provided to the controller 515.

By way of example, prior game status information could include the following status information: at bat=home; innings=5; outs=2; visitor score=4; home score=3; and bases occupied=third. Current game status information could include the following status information: at bat=home; innings=5; outs=2; visitor score=4; home score=4; and bases occupied=first. In such a situation, the comparator element 570 would compare the prior and current game status information and generate a change signal indicating that the home team has a new score and that a runner has advanced (to first). Additionally, the comparator element 570 could generate a signal indicating a tie score. Then, an audio alert sequence would be generated, as described below, indicating the new score followed by an indication of the advanced runner. Furthermore, a different audio alert could be generated to indicate a tie score. A visual alert could indicate the "new score" and the "advanced runner" changes by flashing the home team score and the first base runner icon.

Figure 9:
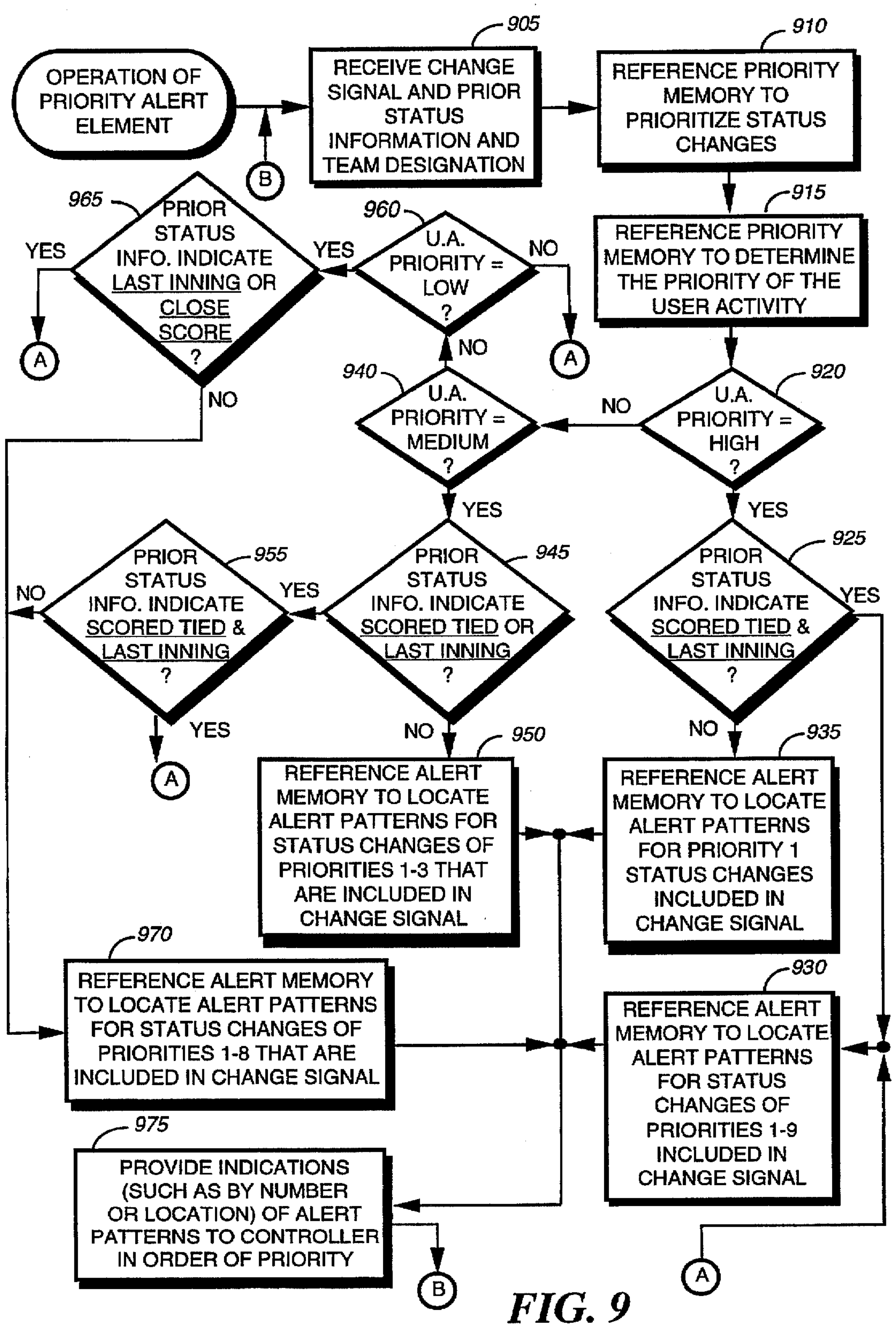
FIG. 9 is a flowchart depicting the operation of a priority alert element included within the data communication receiver of FIG. 5 in accordance with the present invention.

Referring next to FIG. 9, the operation of the priority alert element 575 (FIG. 5) is shown in accordance with the present invention. The priority alert element 575 receives, at step 905, the change signal, the receiver team designation, and the prior status information from the controller 515. Thereafter, the priority memory 540 is referenced, at step 910, to prioritize the status changes indicated in the change signal according to the programmed priorities. Additionally, at step 915, the user activity priority, if programmed, is determined from the priority memory 540.

When, at step 920, the user activity priority is high, indicating that the user is currently involved in an important activity, the priority alert element 575 references the prior status information to determine whether the prior status information is indicative of a predetermined game status. This predetermined game status can be, for example, a critical game status indicating that the game is in the last inning and the score of the game is tied. This can be accomplished, for example, by locating the "inning" portion of the game status information to determine whether the game is currently in the ninth inning, i.e., inning=9. The priority alert element 575 can additionally determine whether the difference between the visitor and home scores is equal to zero, i.e., home score−visitor score=0, to determine whether the game score is tied. When, at step 925, the score is tied and the game is in the last inning, indicating that status changes having all priorities, e.g., priorities one through nine, should be alerted, the alert memory 535 is referenced, at step 930, to locate the alert patterns corresponding to all status changes included in the change signal.

By way of example, referring back to FIG. 5, the change signal could indicate that the only status change indicates that the home team has hit a grand slam, and the second status change stored in the alert memory 535 could correspond to a "grand slam/home team" status change. In such a situation, the alert element 575 would, when the receiver team is the home team, select the third alert pattern for generation of an audible alert indicating a favorable status change. When the receiver team is the visitor team, the fourth alert pattern would be selected, and an unfavorable alert would be generated.

Returning to FIG. 9, when, at step 925, the prior status information indicates that the game is not in its last inning and the score is not tied, e.g., when the game is not at a critical stage, the alert memory 535 is preferably referenced, at step 935, to locate alert patterns corresponding to only higher priority status changes that have occurred in the game. For example, the user may wish to be notified only of the highest priority status change during high priority activities. In such a case, when a plurality of status changes, including a status change of the highest priority, are indicated by the change signal, only the highest priority status change will be audibly announced to the user in order to keep disturbances at a minimum.

When, at step 940, the user activity priority is medium, such as when the user is simply working at his desk, he may desire to receive a greater number of status change alerts even when the game is not at a critical stage. Therefore, the prior status information is preferably referenced, at step 945, to determine whether the game score is tied or whether the game is in the last inning. When either situation is indicated by the prior status information, alert patterns for status changes that have occurred and that have a greater range of priorities are located, at step 970. By way of example, a low priority user activity combined with prior status information indicating either that the score is tied or that the game is in the last inning can result in the retrieval of alert patterns associated with status changes having the top eight priorities. When, at step 955, the prior game status is even more critical, e.g., when the score is tied in the last inning, alert patterns for all status changes indicated in the change signal, regardless of priority level, can be located, at step 930. On the other hand, when the user activity is a medium priority activity and the game is not at a critical stage at all, such as when the score is not tied and when the game is not in the last inning, at step 945, only alert patterns associated with a smaller range of status change priorities are located, at step 950. For instance, alert patterns can be located for status changes having the top three priorities in such a situation.

The user further has the option of setting the user activity priority to a low priority to indicate that status changes of an even greater priority range should be announced. In other words, the alert priority of the receiver 110 can be determined by the prior status information in combination with the user activity priority. When, at step 960, the user activity priority is low, and, at step 965, the prior status information is referenced to determine whether the game is in the last inning or whether the score is close. This can be accomplished by determining whether the difference between the visitor and home scores is less than or equal to a predetermined number, such as two, i.e., home score−visitor score≦2. When the game is in the last inning or the score is close, the alert priority of the receiver 110 is set such that alert patterns corresponding to all status changes are located, at step 930. Conversely, when the game is not in the last inning and when the score is not close, alert patterns corresponding to only a subset of the possible status changes are located, at step 970. Specifically, status changes having priorities exceeding the alert priority are audibly announced to the user.

It will be appreciated that modified, different, or additional game statuses, e.g., tied score or last inning, can be utilized to set receiver alert priorities, i.e., the priority ranges of status changes that will be announced to the user, and that the chosen statuses of "score" and "inning" are depicted for example purposes only. It will be further appreciated that, when the message concerns a topic other than a baseball game, the types of status changes and game statuses may vary as well to include events commonly occurring in a multiple status event concerning the message topic.

As described above, the data communication receiver 110 conveniently sets one of several alert priorities based upon the prior game status information and based upon the user activity priority, if programmed. By way of example, with reference to FIG. 9, the receiver 110 sets one of four alert priorities based upon whether or not the game is at a critical stage and whether or not the user activity is of importance. Incoming messages are thereafter selectively announced by the alert mechanism 550 depending upon whether or not the priority of status changes within the message corresponds to the alert priority set within the receiver 110.

Figure 10:
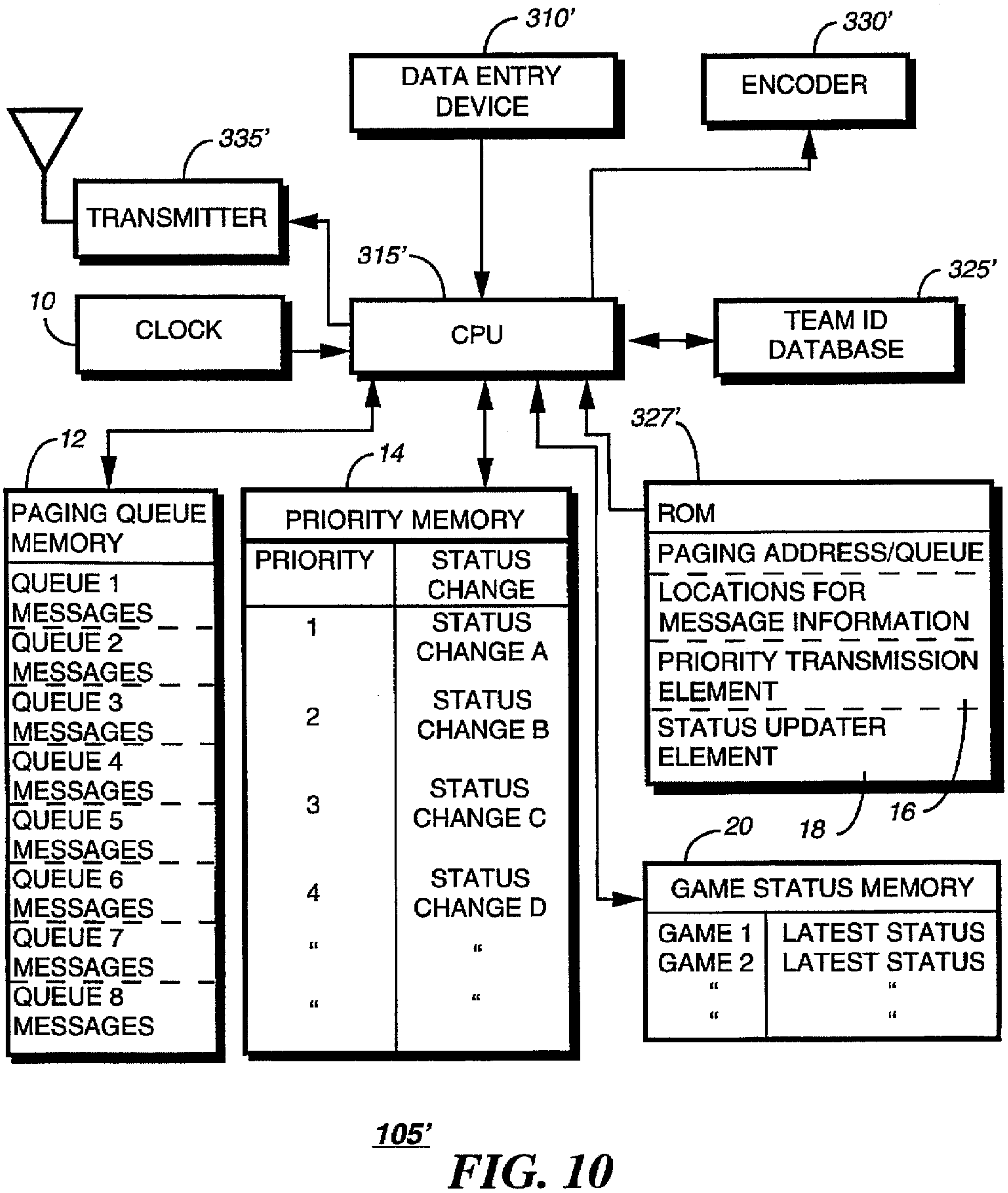
FIG. 10 is an electrical block diagram of an alternative terminal that can be included within the communication system of FIG. 1 in accordance with the present invention.

Messages can also be prioritized and selectively transmitted based upon the message priorities and based upon a loading characteristic of the communication system 100 (FIG. 1) according to an alternate embodiment of the present invention. FIG. 10 is an electrical block diagram of a terminal 105' for selectively transmitting messages based upon priorities of the messages and the variable system loading characteristic, which indicates whether or not the system is crowded and operating close to its maximum messaging capacity. Such a situation could arise, for example, when the POCSAG signalling format is utilized for grouped bulk transmission of messages.

In the POCSAG system, the set of POCSAG pagers are divided into eight groups for each paging channel. Each pager in each group looks for its message to begin in one of the eight frames in a POCSAG batch to which it has been previously assigned. A message can continue into subsequent frames, thereby preventing origination of messages for pagers assigned to those subsequent frames. As the POCSAG system receives messages for multiple users, the messages are stored in eight queues corresponding to the messages for pagers assigned to the eight groups. The amount of time a message remains stored in a queue corresponds to the latency of the message. Under certain circumstances, the number of messages in one queue can become substantially greater than the numbers of messages in other queues, resulting in an overloaded queue.

For example purposes only, the terminal 105' of FIG. 10 is described as utilizing the POCSAG signalling format. The terminal 105' includes a data entry device 310', which receives the game status information and information about which teams are involved in the sports event, and a clock 10, which is referenced by the terminal CPU 315' to stamp incoming information with a reception time. According to the alternate embodiment of the present invention, a team ID database 325' is referenced to determine the team IDs for the entered information, and the team IDs and game status information are stored as a message, along with the reception time, in the appropriate queue of a paging queue memory 12. The terminal 105' further includes a transmitter 335' for transmitting the stored messages and an encoder 330' for encoding the messages, preferably in an order indicated by the reception times, into the POCSAG signalling format for transmission to the data communication receivers 110 (FIG. 1).

Additionally, according to the alternate embodiment of the present invention, the terminal 105' comprises a game status memory 20 for storing game status information for messages transmitted to the receivers 110 and a priority memory 14 for storing different priorities for possible status changes within a sports event, such as a baseball game. The status changes and their corresponding priorities are preferably either predetermined or programmed by the service provider or service user such that stored messages can be prioritized based upon changes in the game that have occurred since the last transmitted message for that game. These priorities can, for example, correspond to the priorities shown in the memory 540 (FIG. 5). A ROM 327' is further included in the terminal 105' for storing the common paging address of the data communication receivers 110 and the queue in which messages for the receivers 110 are stored. The ROM 327' also stores firmware elements for use in processing messages for transmission within the POCSAG system. Such firmware elements include a status updater element 18 for updating game status information stored in the game status memory 20 and a priority transmission element 16 for prioritizing stored messages when the loading characteristic of the system indicates that the paging system is crowded.

According to the alternate embodiment of the present invention, the terminal 105' efficiently utilizes the communication channel, e.g., paging channel, over which messages to the receivers 110 are transmitted by transmitting all messages to the receivers 110 when the channel is not crowded. When, however, the channel becomes crowded enough to substantially load the queue in which the sports messages are stored, each stored message is prioritized based upon a previous game status and the status change reflected by the message. When the game is in a critical stage, such as during the last inning when the score is tied, all messages for that game are preferably transmitted. When, on the other hand, the game is at a less critical stage, the terminal 105' transmits only messages indicative of higher priority status changes. In this manner, the crowded paging channel can be more efficiently utilized while still transmitting messages including more important information to users of the data communication receivers 110.

Figure 11:
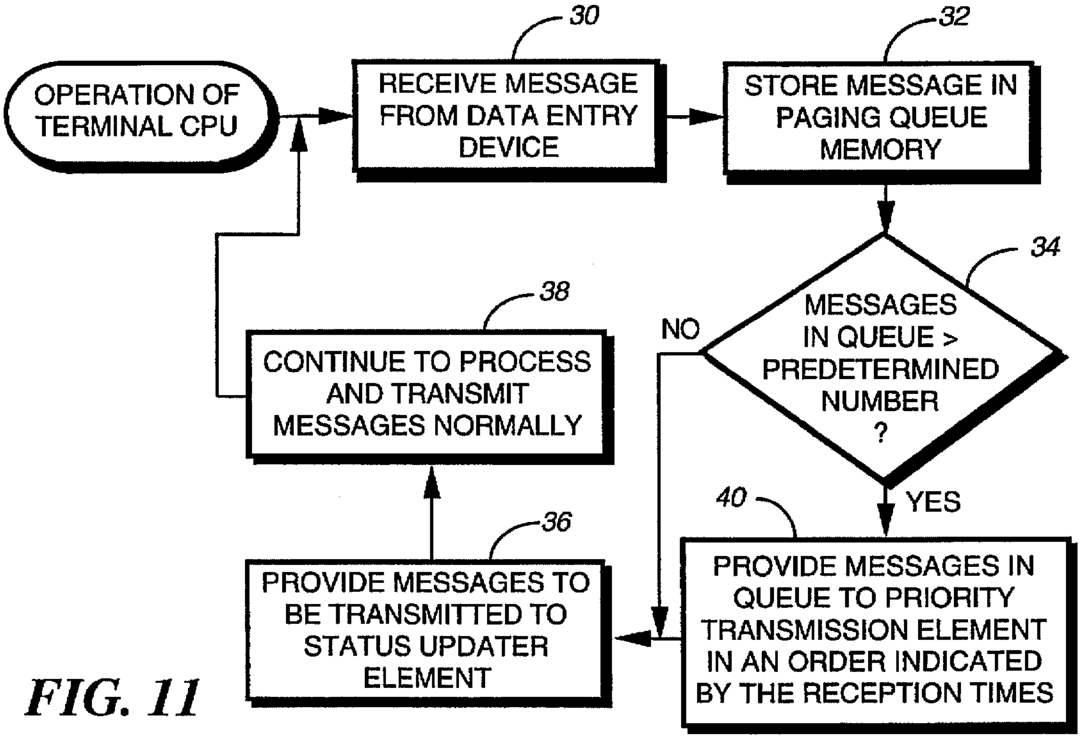
FIG. 11 is a flowchart illustrating the operation of a processing unit included in the terminal of FIG. 10 in accordance with the present invention.

Referring next to FIG. 11, a flowchart depicts the operation of the terminal CPU 315' according to the alternate embodiment of the present invention. At step 30, the CPU 315' receives information from which a message is formed from the data entry device 310'. The message, along with its reception time, is then stored in the paging queue memory 12 (FIG. 10), at step 32. The CPU 315' thereafter, at step 34, determines whether the number of messages stored in the queue exceeds a predetermined number in order to determine the variable loading characteristic of the system, i.e., in order to determine whether or not the system is crowded. This predetermined number is preferably set by the service provider and is a number above which the queue is considered to be substantially loaded. When the number of stored messages is not greater than the predetermined number of messages, indicating that the queue is not highly loaded, the stored messages, all of which are to be transmitted, are then provided to the status updater element 18 (FIG. 10), at step 36. The CPU 315' continues to process and transmit the message normally, at step 38.

When the number of stored messages exceeds the predetermined number, indicating that the paging queue is substantially loaded, the messages in the queue are provided, at step 40, to the priority transmission element 16 in an order indicated by their respective reception times. After processing by the priority transmission element 16, any messages still stored in the queue are provided, at step 36, to the status updater element 18, after which the messages continue to be processed, at step 38.

Although not depicted in the flowchart of FIG. 11, the variable loading characteristic of the system can be characterized not only by the number of messages stored in the paging queue but also by the latency of the stored messages. The latency of the messages is preferably determined by referencing the reception time for a first queued message to determine how long the message has been stored. According to the alternate embodiment of the present invention, when a message has been stored in the paging queue for a time that is greater than a predetermined time, the system is determined to be crowded, and messages are selectively transmitted. When the messages in the queue have been stored for an acceptable period of time that is less than the predetermined time, all messages are preferably transmitted because the system is not considered to be crowded.

Also, although the single criterion of number of messages in a queue is depicted in FIG. 11, it will be understood that other criteria can be used without departing from the teachings herein. Such other criteria can include, for example, an expense associated with message transmission or a time of day. Additionally, multiple criteria could be used in place of a single criterion in a manner similar to that in which multiple criteria are utilized for prioritizing alerts in the data communication receiver 110 according to the present invention.

Figure 12:
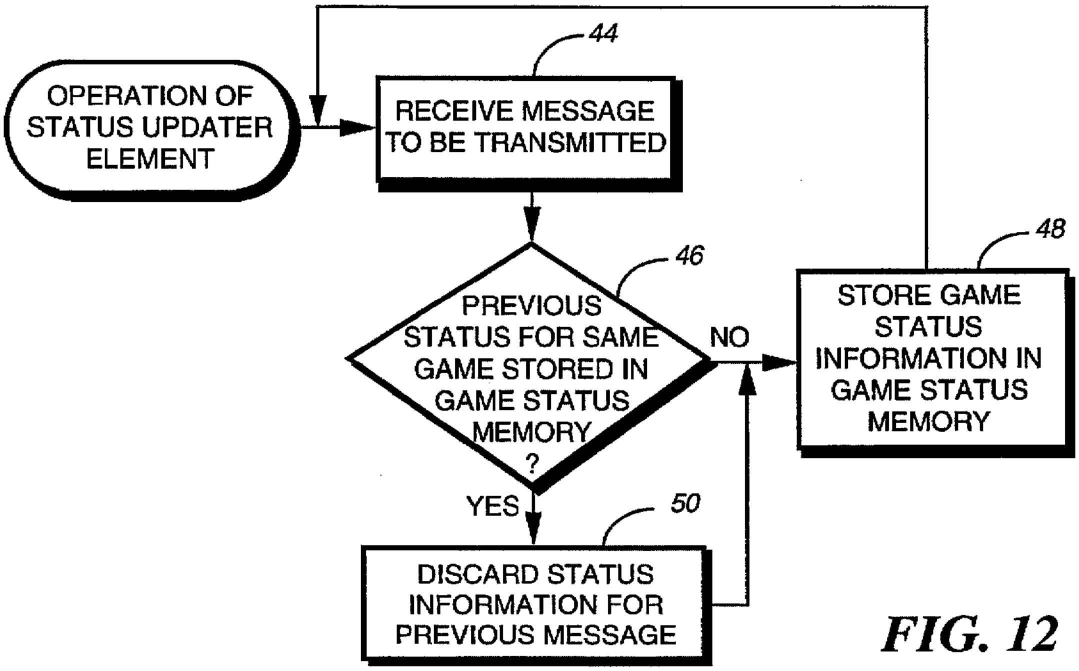
FIG. 12 is a flowchart illustrating the operation of a status updater element included in the terminal of FIG. 10 in accordance with the present invention.

FIG. 12 is a flowchart illustrating the operation of the status updater element 18 in accordance with the alternate embodiment of the present invention. At step 44, the status updater element 18 receives a message that is to be transmitted. When, at step 46, no prior status information for that game is stored in the game status memory 20 (FIG. 10), the game status information for that message is stored, at step 48, in the game status memory 20. When prior status information is stored for that game, the prior status information is discarded, at step 50, subsequent to which the game status information for the current message is stored, at step 48.

Figure 13:
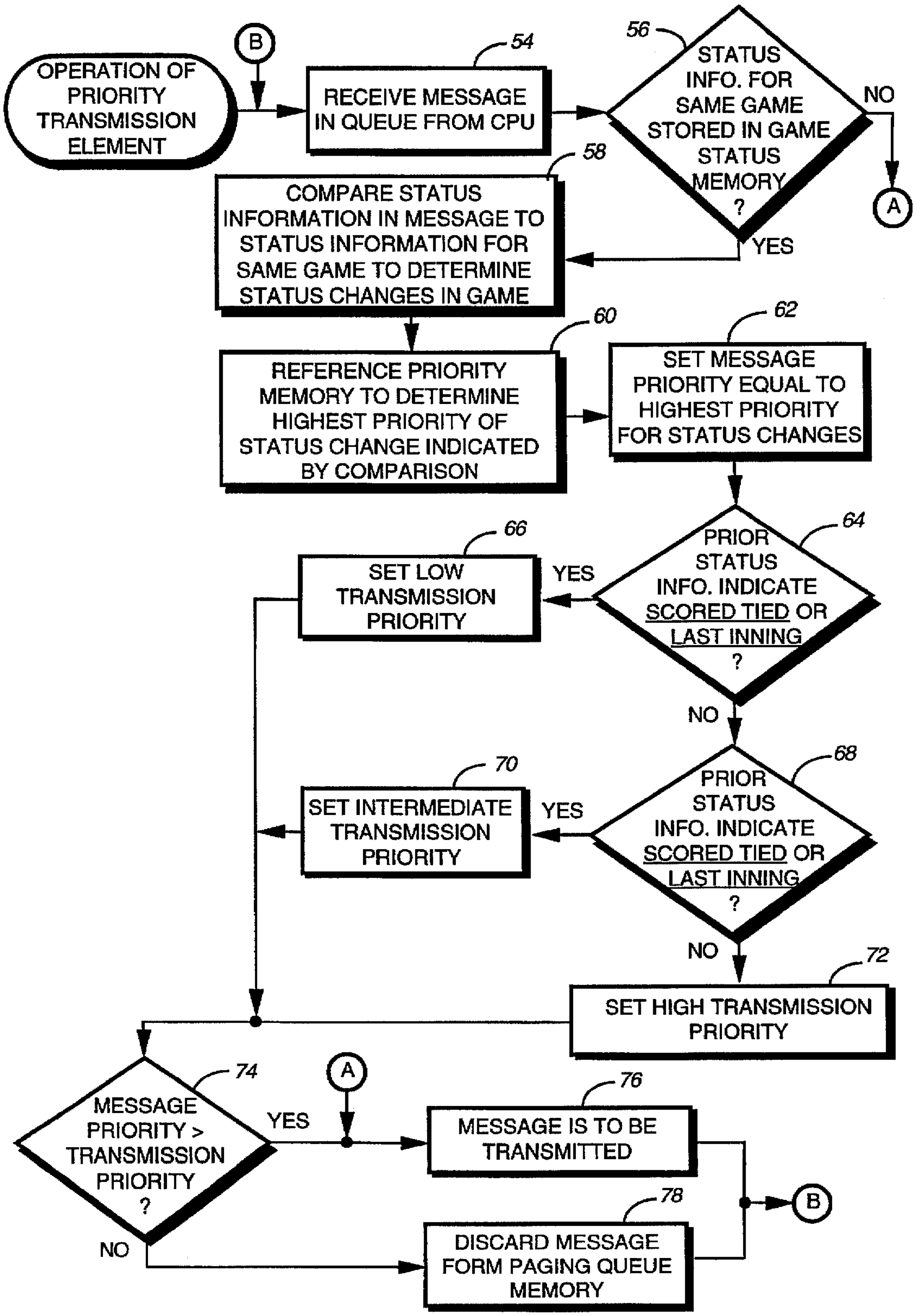
FIG. 13 is a flowchart depicting the operation of a priority transmission element included in the terminal of FIG. 10 in accordance with the present invention.

Referring to FIG. 13, a flowchart depicts the operation of the priority transmission element 16 according to the alternate embodiment of the present invention. At step 54, the priority transmission element 16 receives a queued message from the CPU 315'. When, at step 56, previous status information for the same game is stored in the game status memory 20, the priority transmission element 16 compares, at step 58, the stored status information to the current status information to determine the status changes that have occurred in the game. Thereafter, at step 60, the priority memory 14 (FIG. 10) is referenced to determine the highest priority associated with any status change indicated by the comparison. The highest priority becomes the "message priority" for that message, at step 62.

The priority transmission element 16 then proceeds to determine a "transmission priority" for message transmissions in the system. At step 64, the priority transmission element 16 determines whether the game at a critical stage, such as when the score is tied in the last inning. When the game is at such a critical stage, the transmission priority for the system is set to a low priority, at step 66, to indicate that low priority messages should be transmitted although the system is crowded. When the game is not in the last inning with the score tied, the priority transmission element 16 determines, at step 68, whether the game is at an intermediate stage, such as when the score is tied or when the game is in the last inning. When the game is in the last inning or the score is tied, the priority transmission element 16 sets, at step 70, the transmission priority to an intermediate priority value. When, at steps 64, 68, the game is not at a critical or an intermediate stage, the transmission priority is set to a high priority value, at step 72.

Next, the message priority is compared, at step 74, to the transmission priority. When the message priority exceeds the transmission priority, the message is to be transmitted, at step 76. Therefore, the message is left undisturbed in the paging queue memory 12. When, conversely, the message priority does not exceed the transmission priority, the message is discarded, at step 78, from the queue such that it is not transmitted.

By way of example, when the priority memory 14 stores eight possible status changes, the low transmission priority set when the game is at a critical stage could be equal zero (0). In this situation, the comparison, at step 74, would provide for the transmission of all messages. Similarly, an intermediate transmission priority could equal the number five (5) such that, when the game is in the last inning or the score is tied, only messages having priorities of one through four would be transmitted. Messages having priorities of less than four would be discarded from the queue so that the paging channel would not be further crowded by the transmission of relatively unimportant messages. A high transmission priority could be set to equal the number three (3). In that instance, only messages having priorities of one and two would be transmitted, while other messages would be discarded.

In this manner, only higher priority messages are transmitted during non-critical stages of the game when the variable loading characteristic of the system indicates that the system is crowded. As a result, the paging channel is more efficiently utilized, and the user is not annoyed by receiving multiple messages, some of very low priority, during times when he is unconcerned with low priority events.

It will be appreciated that, in a communication system according to the present invention, messages can be prioritized at both a paging terminal and at a data communication receiver. First, during times when the paging queue is substantially loaded, the terminal prioritizes messages based upon a game status and based upon changes indicated by the stored messages. During more critical stages of the game, a greater number of lower priority messages continue to be transmitted so that the user is updated frequently of events that might change the outcome of the game. During other times during the game, less important messages are not transmitted to the user in order to prevent the overcrowding of the paging channel. This has the further advantage of reducing the cost of providing the information service by reducing expenses associated with transmissions of important messages. Once the messages are received by a data communication receiver, the receiver prioritizes the status changes indicated by the messages such that the user is selectively alerted based upon the importance of the status change as well as the importance of an activity in which the user is involved.

It will be further appreciated that the message reduction characteristics of the communication system according to the present invention can also be adopted for the transmission of messages to individual receivers rather than to groups of receivers carried by sports fans. In such a situation, the user can advantageously customize the priorities of the priority memory 14 (FIG. 10) as well as the decision criteria which characterize the status of an event as "critical". Furthermore, the user could define the disposition of information based upon event status and message priority and could further determine the conditions under which stored messages will be filtered and discarded prior to transmission by the terminal 105'.

As mentioned above in reference to the data communication receiver 110 in accordance with the present invention, different or additional game statuses, e.g., tie score or last inning, can be utilized by the terminal 105' to set the transmission priorities indicative of the priorities of messages that are to be transmitted during times when the paging queue is highly loaded. Also, when the messages concern topics other than a baseball game, the types of status changes and game statuses can be varied to include events that commonly occur in a multiple status event concerning the message topic. The transmission priority set by the priority transmission element 16 is described as being set at three different levels for example purposes only. It will be understood that other transmission priorities could reflect other event statuses according to which messages having different ranges of message priorities would be transmitted.

In summary, the communication system as described above includes a terminal for transmitting status information about a multiple status event, such as a baseball game or other sports event. Preferably, each message transmitted by the terminal includes home and visitor identification (ID) codes for identifying the teams currently playing in a game. The message also includes game status information concerning different game statuses, such as number of outs, score, etc. During times in which the paging channel is crowded, the game status information can be utilized by the terminal to selectively transmit the message based upon the importance of a status change within the game. For example, during more critical stages of the game, all messages can be transmitted while, during less critical stages, only a limited number of messages having high priority status changes are transmitted. In this way, the paging channel is efficiently utilized to lessen crowding and messaging delays.

According to the present invention, the communication system further includes data communication receivers for receiving the messages transmitted by the terminal and displaying the game status information in each message to the user. Additionally, a data communication receiver determines, by comparing an incoming message to a previously received message, whether any status changes have occurred in the game. When no status changes have occurred, the user is preferably not alerted of message reception. As a result, the terminal can transmit multiple duplicate messages to increase the likelihood of accurate message reception at the receivers without annoying the users by causing multiple alerts for reception of the same message.

Furthermore, because the data communication receiver compares new messages to old messages to determine status changes and generates alerts based upon this comparison, alert codes need not be transmitted within a message to instruct the receiver which of predetermined alerts is to be generated. Therefore, the messaging method utilized by the communication system according to the present invention utilizes paging channels more efficiently than do prior art systems in which alert codes for each team are transmitted within each message.

According to the present invention, the data communication receiver also possesses the capability of prioritizing status changes when more than one status change has occurred since reception of a last message about a game. Additionally, the user can program a priority, e.g., high, medium, or low, of an activity in which he is involved. The data communication receiver then selectively alerts a user of an incoming message based upon the previous game status, the importance of the changes in that status, and the importance of an activity in which the user is involved. The user is preferably alerted to any change which could effect the outcome of the game during critical game times. During times in which the game is at a non-critical stage, the user is alerted to a greater number of status changes during a relatively unimportant user activity than during an important activity. As a result, the user is not disturbed by the announcement of trivial game changes unless he indicates that he is involved in a low priority activity.

It will be appreciated that there has been provided a method and apparatus for more efficiently utilizing paging channels by prioritizing, during busy times, messages that are to be transmitted based upon the status of a sports event and the importance of the changes therein. Furthermore, a receiver has been provided for receiving the transmitted messages and selectively alerting the user based upon the importance of the status changes and the importance of a user activity, thereby eliminating situations in which the user is disturbed for announcement of a trivial status change during an important user activity.

What is claimed is:

1. A method for prioritizing alerts in a data communication receiver for receiving information about an event, the method comprising the steps of:

receiving a first message including first status information about the event;

setting an alert priority in response to the first status information wherein the alert priority is indicative of different stages, including a critical stage, of the event, and wherein the alert priority is set by the data communication receiver without user intervention;

receiving, subsequent to receiving the first message, a second message including second status information about the same event, wherein the second status information is different from the first status information;

comparing the first and second status information to determine a status change in the event that has occurred between the sending of the first message and the sending of the second message;

setting a status change priority of the status change automatically and without user intervention, wherein the status change priority is unrelated to the alert priority;

alerting, automatically and without user intervention, a user of the status change regardless of the status change priority when the event that is the subject of both the first and second messages is determined to be at the critical stage by reference to the alert priority; and selectively alerting a user, automatically and without user intervention, responsive to the status change priority and the alert priority when the event is not at the critical stage.

2. The method of claim 1, wherein the selective alerting step comprises the step of:

selectively alerting a user in response to reception of the second status information when the status change priority exceeds the alert priority so that, as the different stages of the event approach the critical stage, only higher priority status changes are alerted.

3. The method of claim 1, further comprising, prior to the step of setting the alert priority, the step of:

receiving a user-initiated signal indicating an importance of an activity in which the user is involved.

4. The method of claim 3, wherein the step of setting the alert priority comprises the step of:

setting the alert priority in response to the first status information and in response to the importance of the activity in which the user is involved.

5. The method of claim 1, wherein the first and second messages concern a sports event, and wherein:

the step of setting the alert priority comprises the step of determining a stage of the sports event as indicated by the first status information; and the step of selectively alerting the user comprises the steps of:

alerting the user to messages having all status change priorities when the sports event is at a critical stage; and alerting the user of messages having only a subset of status change priorities when the sports event is not at a critical stage.

6. A data communication receiver for prioritizing alerts, the data communication receiver comprising:

first status information about an event and for later receiving a second message about the same event, the second message including second status information different from the first status information;

a priority alert element coupled to the receiver for setting, without user intervention, an alert priority in response to the first status information, wherein the alert priority is indicative of different stages, including a critical stage, of the event that is the subject of the first and second messages;

a comparator coupled to the receiver for comparing the first and second status information to determine a status change in the event that has occurred between the sending of the first message and the sending of the second message, wherein the priority alert element sets, without user intervention, a status change priority that is associated with the status change and that is unrelated to the alert priority; and an alert mechanism coupled to the receiver and the priority alert element for automatically alerting, without user intervention, a user of the status change regardless of the status change priority when the alert priority indicates that the event is at the critical stage, and for selectively alerting a user responsive to the status change priority and the alert priority when the event is not at the critical stage.

7. The data communication receiver of claim 6, wherein the first and second messages concern a sports event, and wherein the alert priority is indicative of whether or not the sports event is at a critical stage.

8. The data communication receiver of claim 6, further comprising:

controls for receiving a user-initiated signal indicating an importance of an activity in which the user is involved, wherein the priority alert element sets, without further user intervention, the alert priority in response to the first status information and in response to the importance of the activity in which the user is involved.

9. The data communication receiver of claim 8, further comprising:

priority memory for storing a user activity priority determined from the user-initiated signal and indicative of the importance of the activity and for storing status change priorities associated with various possible status changes in the event, wherein the user activity priority is unrelated to the status change priority.

* * * * *